United States Patent
Skugor et al.

(10) Patent No.: US 11,945,456 B2
(45) Date of Patent: Apr. 2, 2024

(54) VEHICLE CONTROL FOR OPTIMIZED OPERATION

(71) Applicant: Ford Global Technologies, LLC, Dearborn, MI (US)

(72) Inventors: Branimir Skugor, Sesvete (HR); Jakov Topic, Zaprešić (HR); Josko Deur, Zagreb (HR); Vladimir Ivanovic, Canton, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 17/588,401

(22) Filed: Jan. 31, 2022

(65) Prior Publication Data
US 2023/0242134 A1    Aug. 3, 2023

(51) Int. Cl.
*B60W 50/12* (2012.01)
*B60W 30/18* (2012.01)
*B60W 40/105* (2012.01)
*B60W 50/06* (2006.01)

(52) U.S. Cl.
CPC ...... *B60W 50/12* (2013.01); *B60W 30/18109* (2013.01); *B60W 40/105* (2013.01); *B60W 50/06* (2013.01); *B60W 2554/4041* (2020.02)

(58) Field of Classification Search
CPC .......... B60W 30/143; B60W 30/0956; B60W 30/18109; B60W 50/06; B60W 50/12; B60W 50/0097; B60W 40/105; B60W 60/0027; B60W 60/0011; B60W 2554/4041
See application file for complete search history.

(56) References Cited

U.S. PATENT DOCUMENTS

| | | |
|---|---|---|
| 8,239,380 B2 | 8/2012 | Brill et al. |
| 11,062,606 B2 | 7/2021 | Beauchamp |
| 11,656,093 B2 * | 5/2023 | Pan ................. B60W 60/00253 701/24 |

(Continued)

FOREIGN PATENT DOCUMENTS

EP    2881829 B1    5/2018

*Primary Examiner* — Phutthiwat Wongwian
*Assistant Examiner* — Arnold Castro
(74) *Attorney, Agent, or Firm* — Frank A. MacKenzie; Bejin Bieneman PLC

(57) ABSTRACT

Upon detecting a mobile object approaching a target region, a target speed profile for a vehicle, a position and a speed for the vehicle, and a position and a speed for the mobile object are input to a first neural network that outputs an entry probability distribution of predicted entry times at which the mobile object will enter the target region. The target speed profile, the position and the speed for the vehicle, the position and the speed for the mobile object, and a predicted entry time at which the mobile object entered the target region are input to a second neural network that outputs an exit probability distribution of predicted exit times at which the mobile object will exit the target region. An optimized speed profile is determined based on the entry and exit probability distributions by executing a model predictive control algorithm in a rolling horizon. A vehicle is operated based on the optimized speed profile.

20 Claims, 9 Drawing Sheets

(56) References Cited

U.S. PATENT DOCUMENTS

| | | | |
|---|---|---|---|
| 11,667,304 B2* | 6/2023 | Chen ................... | G06V 20/588 |
| | | | 701/36 |
| 11,715,338 B2* | 8/2023 | Vejalla .................. | G07C 5/008 |
| | | | 701/31.4 |
| 2019/0361454 A1 | 11/2019 | Zeng et al. | |
| 2020/0134427 A1* | 4/2020 | Oh ........................ | G06N 3/084 |
| 2021/0122373 A1 | 4/2021 | Dax | |
| 2022/0289248 A1* | 9/2022 | Niewiadomski .. | B60W 50/0098 |
| 2023/0242134 A1* | 8/2023 | Skugor ................ | B60W 50/06 |
| | | | 701/70 |

* cited by examiner

VEHICLE CONTROL FOR OPTIMIZED OPERATION

BACKGROUND

A vehicle can be equipped with electronic and electro-mechanical components, e.g., computing devices, networks, sensors, and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
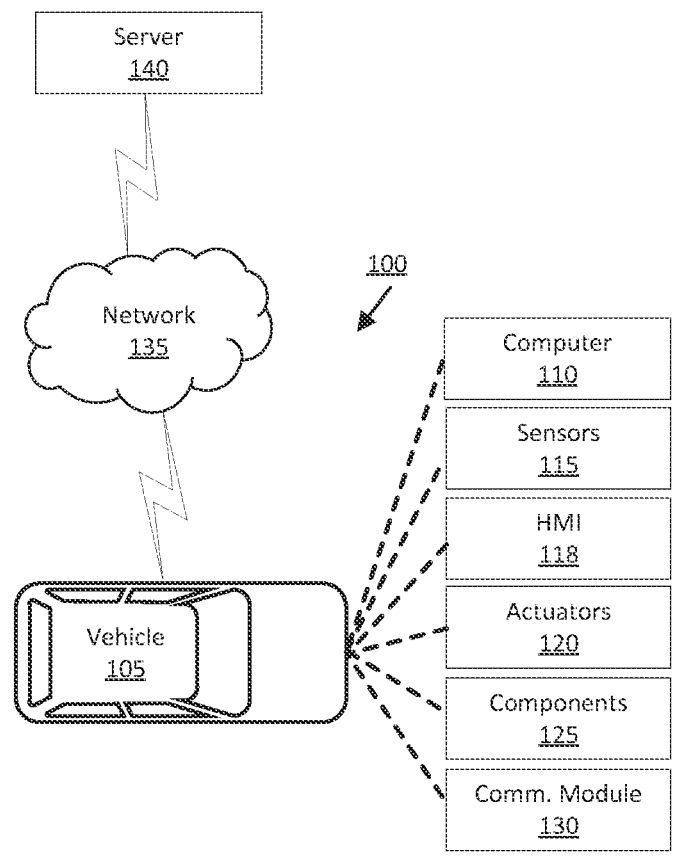
FIG. 1 is a block diagram of an example control system for a vehicle.

A vehicle computer can operate a vehicle along a travel path that includes a target region in which a mobile object may cross the travel path. For example, a vehicle may encounter mobile objects such as pedestrians or bicycles at or near an intersection; the target region can be determined with respect to an intersection. Upon detecting a mobile object in the target region, the vehicle computer may update vehicle operation to reduce a likelihood of impacting the mobile object in the target region, e.g., by actuating a braking component to reduce a speed of the vehicle until the mobile object departs the target region. However, updating vehicle operation in response to detecting the mobile object in the target region can increase an amount of time for the vehicle to traverse the target region.

Advantageously, upon detecting a mobile object approaching a target region, the vehicle computer can determine an optimized speed profile based on an entry probability distribution of predicted entry times at which the mobile object will enter the target region and an exit probability distribution of predicted exit times at which the mobile object will exit the target region, e.g., by using a model predictive control algorithm and an exhaustive grid search, as discussed below. The vehicle computer can determine the entry and exit probability distributions as outputs from respective neural networks, as discussed below. The vehicle computer can then operate the vehicle based on the optimized speed profile. Operating the vehicle based on the optimized speed profile allows the vehicle computer to updated vehicle operation upon detecting a mobile object approaching a target region, which can reduce an amount of time for the vehicle to traverse a target region while reducing a likelihood of the vehicle impacting the mobile object in the target region.

A system includes a computer including a processor and a memory, the memory storing instructions executable by the processor to, upon detecting a mobile object approaching a target region, input a target speed profile for a vehicle, a position and a speed for the vehicle and a position and a speed for the mobile object to a first neural network that outputs an entry probability distribution of predicted entry times at which the mobile object will enter the target region. The instructions further include instructions to input the target speed profile, the position and the speed for the vehicle, the position and the speed for the mobile object, and a predicted entry time at which the mobile object entered the target region to a second neural network that outputs an exit probability distribution of predicted exit times at which the mobile object will exit the target region. The instructions further include instructions to determine an optimized speed profile based on the entry and exit probability distributions by executing a model predictive control algorithm in a rolling horizon. The instructions further include instructions to operate a vehicle based on the optimized speed profile.

The target speed profile can be defined by a target speed and a target acceleration.

The instructions can further include instructions to, upon detecting an absence of the mobile object approaching the target region, operate the vehicle based on a requested speed.

The instructions can further include instructions to determine the requested speed based on a user input.

The instructions can further include instructions to determine the requested speed based on map data.

The instructions can further include instructions to, upon detecting the mobile object departing the target region, operate the vehicle based on the requested speed.

The instructions can further include instructions to, upon detecting the mobile object departing the target region, operate the vehicle based on a requested speed.

The instructions can further include instructions to optimize the target speed profile based on a probability that the vehicle will impact the mobile object in the target region.

The instructions can further include instructions to optimize the target speed profile based additionally on minimizing a cost function for an amount of time for the vehicle to traverse the target region.

The instructions can further include instructions to, upon detecting the mobile object within the target region, actuate a brake component of the vehicle.

The instructions can further include instructions to, upon determining that the mobile object has departed the target region, operate the vehicle based on a requested speed.

The target region can extend entirely across a travel path and partially along the travel path.

The instructions can further include instructions to identify the target region based on detecting markings traversing the travel path.

The instructions can further include instructions to identify the target region based on map data.

A method includes, upon detecting a mobile object approaching a target region, inputting a target speed profile for a vehicle, a position and a speed for the vehicle and a position and a speed for the mobile object to a first neural network that outputs an entry probability distribution of predicted entry times at which the mobile object will enter the target region. The method further includes inputting the target speed profile, the position and the speed for the vehicle, the position and the speed for the mobile object, and a predicted entry time at which the mobile object entered the target region to a second neural network that outputs an exit probability distribution of predicted exit times at which the mobile object will exit the target region. The method further includes determining an optimized speed profile based on the entry and exit probability distributions by executing a model predictive control algorithm in a rolling horizon. The method further includes operating a vehicle based on the optimized speed profile.

The target speed profile can be defined by a target speed and a target acceleration.

The method can further include, upon detecting one of an absence of the mobile object approaching the target region or the mobile object departing the target region, operating the vehicle based on a requested speed.

The method can further include, upon detecting the mobile object within the target region, actuating a brake component of the vehicle.

The method can further include optimizing the target speed profile based on a probability that the vehicle will impact the mobile object in the target region.

The method can further include optimizing the target speed profile based additionally on minimizing a cost function for an amount of time for the vehicle to traverse the target region.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-5, an example control system 100 includes a vehicle 105. A vehicle computer 110 in the vehicle 105 receives data from sensors 115. The vehicle computer 110 is programmed to, upon detecting a mobile object 220 approaching a target region 210, input a target speed profile $T_{a,v}$ for the vehicle 105, a position $s_v$ (as discussed below) and a speed $v_v$ for the vehicle 105, and a position $s_p$ (as discussed below) and a speed $v_p$ for the mobile object 220 to a first neural network 400 that outputs an entry probability distribution $P_1$ of predicted entry times at which the mobile object 220 will enter the target region 210. The vehicle computer 110 is further programmed to input the target speed profile $T_{a,v}$, the position $s_v$ and the speed $v_v$ for the vehicle 105, the position $s_p$ and the speed $v_p$ for the mobile object 220, and a predicted entry time $P_{p,i}$ at which the mobile object 220 entered the target region 210 to a second neural network 500 that outputs an exit probability distribution $P_2$ of predicted exit times at which the mobile object 220 will exit the target region 210. The vehicle computer 110 is further programmed to determine an optimized speed profile $T_o$ based on the entry and exit probability distributions $P_1$, $P_2$, by executing a model predictive control algorithm in a rolling horizon (as discussed below). The vehicle computer 110 is further programmed to operate the vehicle 105 based on the optimized speed profile $T_o$.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC (application specific integrated circuit) that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g., front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave, and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, a key fob, etc. Further, the user device 145 can be accessed via the network 135, e.g., the Internet, a cellular network, and/or or some other wide area network.

Figure 2A:
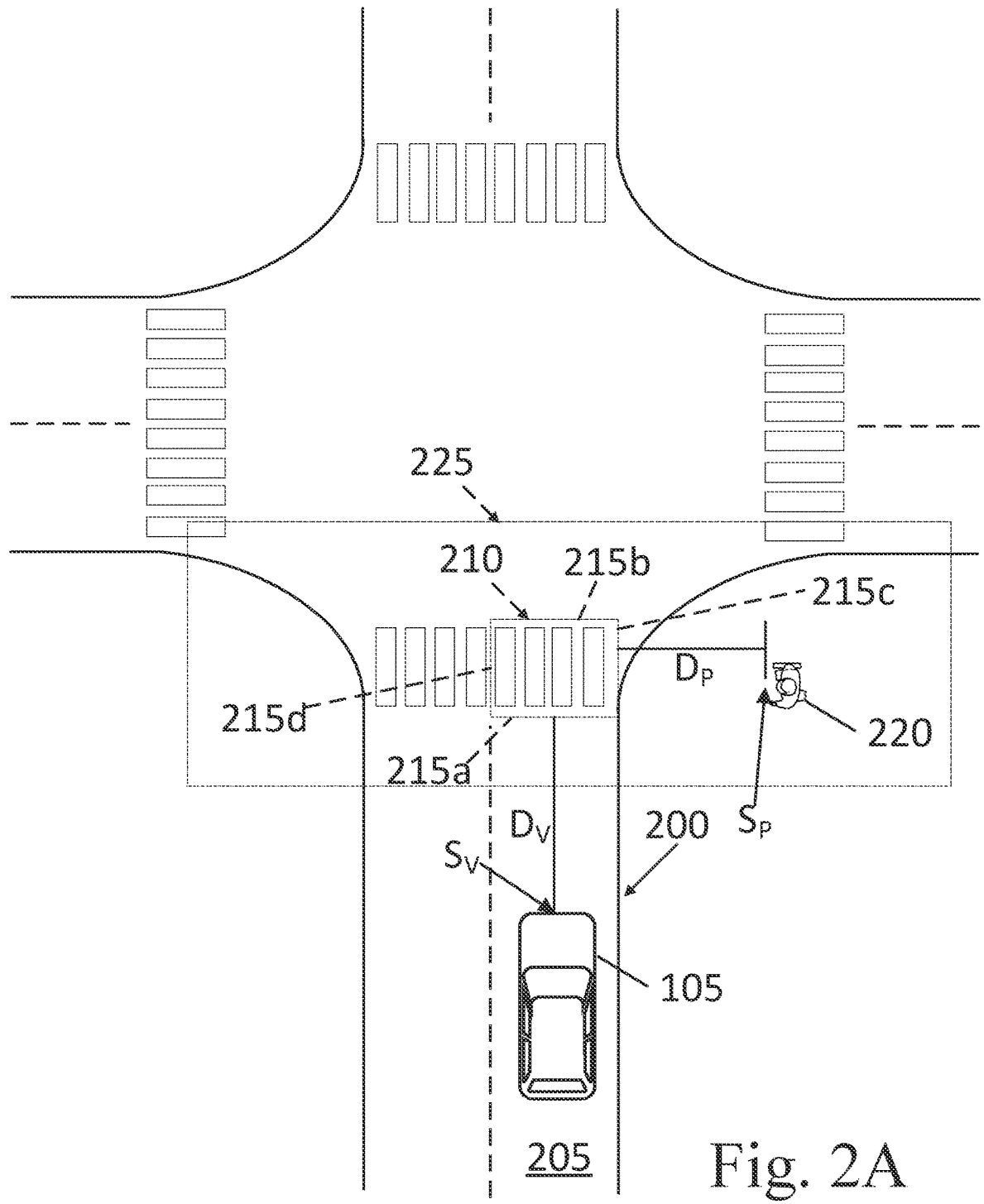
FIGS. 2A-2C are diagrams of an example vehicle approaching an example target region.
Figure 2B:
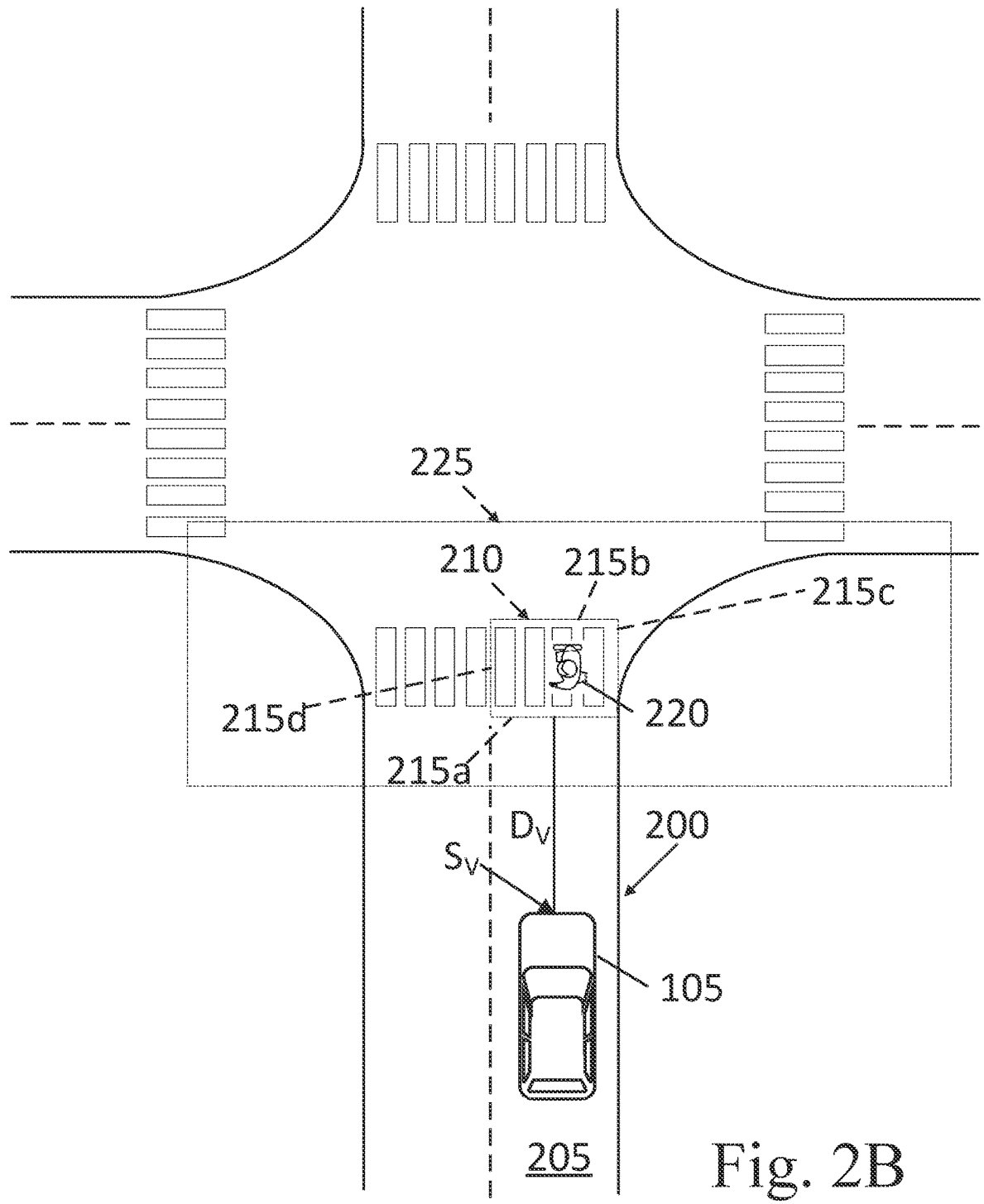
Figure 2C:
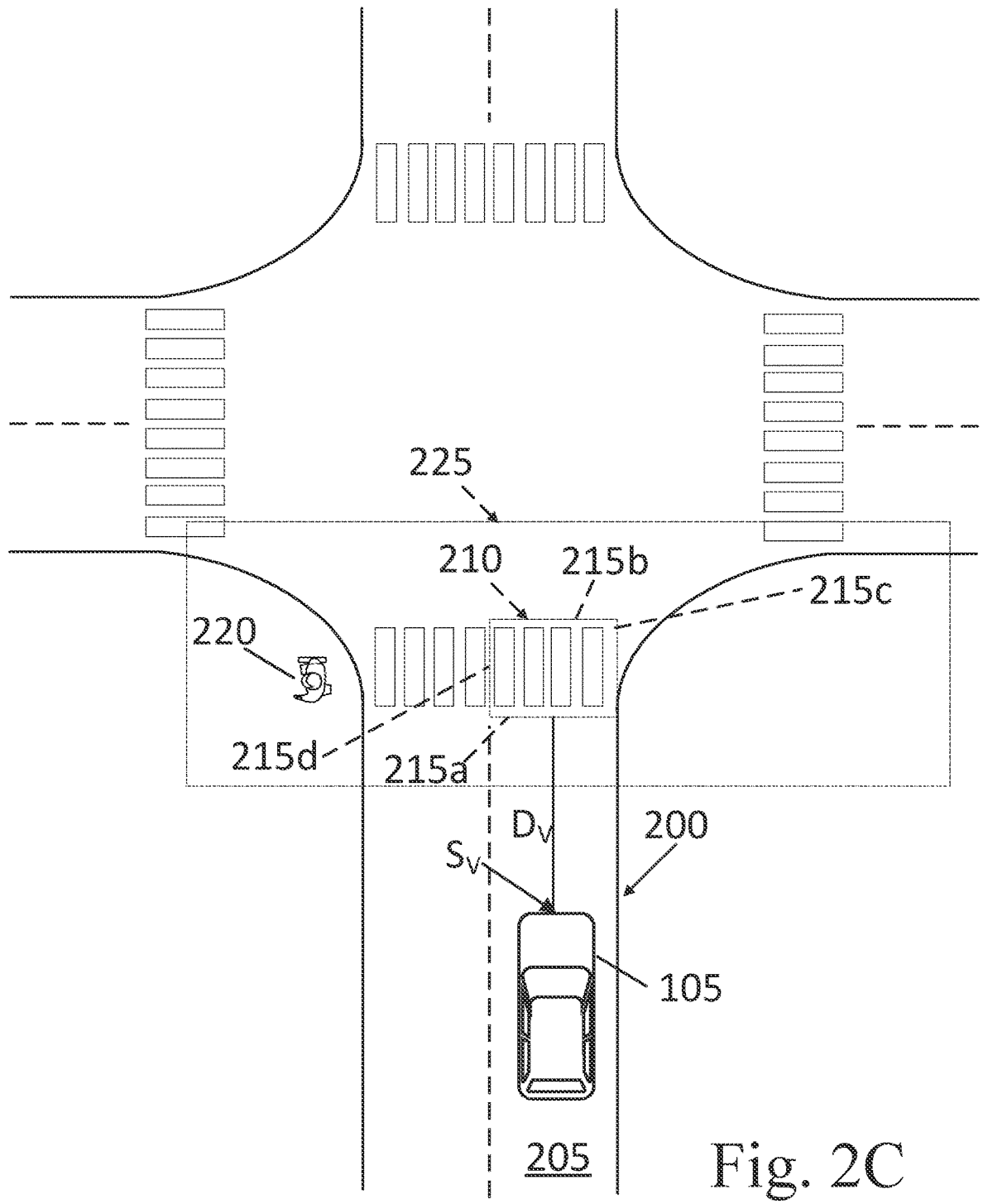
Figure 3A:
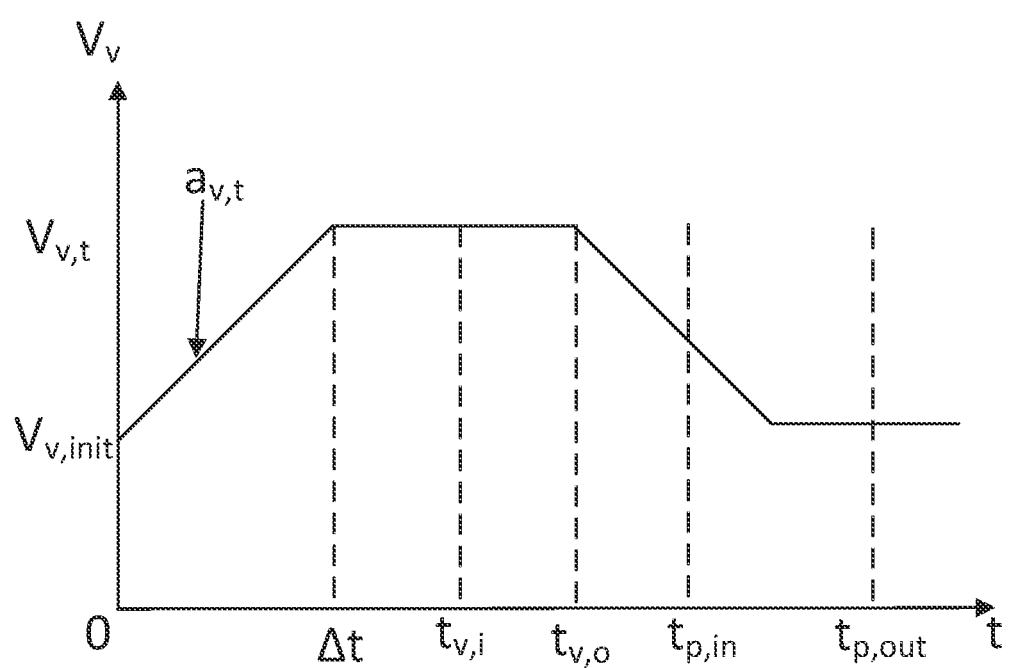
FIGS. 3A-3B are exemplary piecewise affine functions for determining an exit time at which the vehicle will exit the target region.
Figure 3B:
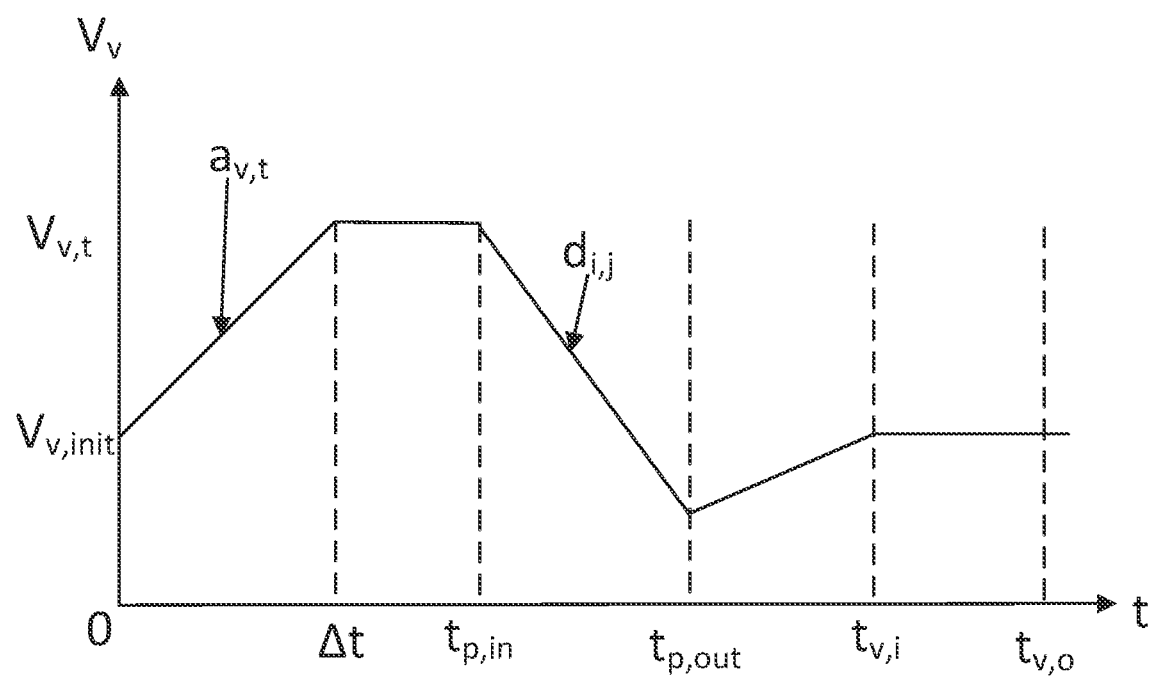

FIGS. 2A-2C are diagrams illustrating a vehicle 105 operating in an example operating area 200. An operating area 200 is a specified area of ground surface for operating a vehicle. The operating area 200 may be on a street or road, e.g., an area alongside a curb or an edge of the street, a parking lot or structure or portion thereof, etc. The operating area 200 can include one or more travel paths 205. A travel path 205 is a specified area within an operating area 200, e.g., a lane or an aisle, for vehicle travel.

A travel path 205 may be unidirectional, i.e., provided for vehicle travel in one direction along the travel path 205, or bidirectional, i.e., provided for vehicle travel in opposing directions along the travel path 205. For example, the travel path 205 may provide for a direction of travel from one end of the travel path 205 to the other end of the travel path 205. In an example in which the travel path 205 is bidirectional, the travel path 205 provides for another direction of travel opposing the direction of travel. The travel path 205 may, for example, accommodate only one vehicle, i.e., such that multiple vehicles can travel in the travel path 205 one in front of the other, but not abreast of, i.e., laterally adjacent, one another. Alternatively, the travel path 205 may accommodate multiple vehicles, i.e., such that multiple vehicles can travel in the travel path 205 abreast of one another.

The vehicle computer 110 can define a local two-dimensional coordinate system having an origin at the vehicle 105 (e.g., a center point of a rear axle, a center point of a front bumper, etc.). As one example, the local coordinate system can be a cartesian coordinate system. In such an example, the local coordinate system defines points x, y, where x is a coordinate along a longitudinal axis of the vehicle 105 and y is a coordinate along a lateral axis of the vehicle 105. That is, x coordinates extend in a vehicle-forward and vehicle-rearward direction (sometimes referred to as a longitudinal direction), and y coordinates extend in a vehicle-crosswise direction (sometimes referred to as a lateral direction). As another example, the local coordinate system may be a polar coordinate system, a spherical coordinate system, etc. A "position" of a vehicle or other object, e.g., the position $s_v$ for the vehicle 105 and the position $s_p$ for the mobile object 220 herein means a location, i.e., that can be specified by coordinates of the object in the local coordinate system.

The vehicle computer 110 can operate the vehicle 105 based on a requested speed $v_{v,0}$ when operating in the operating area 200. For example, the vehicle computer 110 can actuate one or more vehicle components 125 to move the vehicle 105 at the request speed. The vehicle computer 110 can, for example, determine the requested speed $v_{v,0}$ based on map data. In such an example, the vehicle computer 110 can access map data, e.g., stored in a memory of the vehicle computer 110. The vehicle computer can then determine the requested speed $v_{v,0}$ based on a speed specified by the map data, e.g., a speed limit, for the travel path 205.

As another example, the vehicle computer 110 can determine the requested speed $v_{v,0}$ based on a user input. In such an example, the vehicle computer 110 may actuate the HMI 118 to detect the user input selecting the requested speed $v_{v,0}$ for the vehicle 105. For example, the HMI 118 may be actuated and/or instructed by the vehicle computer 110 to display virtual buttons on a touchscreen display that a user can select to specify the requested speed $v_{v,0}$. In other words, the HMI 118 may activate sensors 115 that can detect the user selecting the virtual buttons to specify the requested speed $v_{v,0}$. Upon detecting the user input, the HMI 118 can provide the user input to the vehicle computer 110, and the vehicle computer 110 can determine the requested speed $v_{v,0}$ for the vehicle 105.

The vehicle computer 110 can receive sensor 115 data, e.g., image data, of an environment around the vehicle 105 when operating in the operating area 200. The image data can include one or more mobile objects 220 around the vehicle 105. For example, object classification or identification techniques, can be used, e.g., in the vehicle computer 110 based on LIDAR sensor 115, camera sensor 115, etc., data to identify a type of mobile object 220, e.g., a vehicle, a bicycle, scooter, another vehicle, a pedestrian, etc., as well as physical features of objects 220. The mobile object 220 may be any object that moves under power generated by or in the mobile object (e.g., a bicycle is a mobile object, but a boulder is not).

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects 220, is provided to a machine learning program for training the classifier. Once trained, the classifier can accept as input vehicle sensor 115 data, e.g., an image, and then provide as output, for each of one or more respective regions of interest in the image, an identification of an object 220 or an indication that no object 220 is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

Additionally, the vehicle computer 110 can identify a target region 210 in the travel path 205 when operating in the operating area 200. A target region 210 is a specified area that extends entirely across the travel path 205 and partially along, e.g., a length of, the travel path 205. That is, the target region 210 extends from one side to the other side of the travel path 205 and is spaced from at least one of the ends of the travel path 205. A target region 210 may be bidirectional, i.e., provided for mobile object 220 travel in opposing directions across the travel path 205. The target region 210 may accommodate multiple mobile objects 220, i.e., such that multiple mobile objects 220 can travel in the target region abreast of one another.

The target region 210 includes a front boundary 215a, a rear boundary 215b, a near-side boundary 215c, and a far side boundary 215d. As used herein, a "front boundary" is a boundary of the target region 210 that extends across the travel path 205 transverse to a direction of travel of the travel path 205 and is crossed by the vehicle 105 to enter the target region 210. As used herein, a "rear boundary" is a boundary of the target region 210 that extends across the travel path 205 transverse to a direction of travel of the travel path 205 and is crossed by the vehicle 105 to exit the target region 210. As used herein, a "near-side boundary" is a boundary of the target region 210 that extends along the travel path 205 parallel to the direction of travel of the travel path 205 and is crossed by the mobile object 220 to enter the target region 210. As used herein, a "far-side boundary" is a boundary of the target region 210 that extends along the travel path 205 parallel to the direction of travel of the travel path 205 and is crossed by the mobile object 220 to exit the target region 210. The front and rear boundaries 215a, 215b each extend from the near-side boundary 215c to the far side boundary 215d. Similarly, the near-side and far-side boundaries 215c, 215d each extend from the front boundary 215a to the rear boundary 215b.

The vehicle computer 110 can, for example, identify the target region 210 based on map data of the operating area 200. The vehicle computer 110 can receive the map data of the operating area 200, e.g., from a remote server computer 140. The map data can, for example, specify a perimeter of the target region 210 within the operating area 200, i.e., a geo-fence. A geo-fence herein has the conventional meaning of a boundary for an area defined by sets of geo-coordinates. As another example, the vehicle computer 110 can identify the target region 210 based on sensor 115 data, e.g., image data. In such an example, the target region 210 may be indicated by conventional markings, e.g., painted lines on a ground surface, and conventional image recognition techniques can be employed by the vehicle computer 110 to identify the target region 210.

The vehicle computer 110 is programmed to determine whether the vehicle 105 is within the target region 210. For example, the vehicle computer 110 may receive a location of the vehicle 105, e.g., from a sensor 115, a navigation system, a remote server computer 140, etc. The vehicle computer 110 can then compare the location of the vehicle 105 to a geo-fence for the target region 210. The vehicle computer 110 can then determine that the vehicle 105 is within the target region 210 based on the location of the vehicle 105 indicating the vehicle 105 is within the geo-fence.

Upon determining that the vehicle 105 is outside of the target region 210, the vehicle computer 110 is programmed to determine whether the vehicle 105 is approaching or departing the target region 210. The vehicle computer 110 can determine that the vehicle 105 is approaching the target region 210 based on determining that a direction of travel of the vehicle 105 is towards the target region 210, i.e., the target region 210 is in front of the vehicle 105 relative to a vehicle-forward direction. Conversely, the vehicle computer 110 can determine that the vehicle 105 is departing the target region 210 based on determining that the direction of travel of the vehicle 105 is away from the target region 210, i.e., the target region 210 is behind the vehicle 105 relative to a vehicle-forward direction Upon determining that the vehicle 105 is approaching the target region 210, the vehicle computer 110 is programmed to update vehicle 105 operation based on detecting a presence or absence of a mobile object 220 within a monitoring area 225 around a target region 210. A monitoring area 225 is defined as an area around the target region 210. The vehicle computer 110 can identify a mobile object 220 based on sensor 115 data, e.g., by using the object identification and/or classification techniques discussed above. The vehicle computer 110 can determine that a mobile object 220 is within the monitoring area 225 based on a location of the mobile object 220. The vehicle computer 110 can, for example, determine a location of the mobile object 220 (as discussed below) and can compare the location to a geo-fence for the monitoring area 225. The vehicle computer 110 can then determine that the mobile object 220 is within the monitoring area 225 based on the location of the mobile object 220 indicating the mobile object 220 is within the geo-fence.

To determine the location of the mobile object 220, the vehicle computer 110 can, for example, receive location data from a user device 145 associated with the mobile object 220 specifying the location of the mobile object 220. Alternatively, the vehicle computer 110 can determine the location of the mobile object 220 based on sensor 115 data. As one example, the vehicle computer 110 can receive image data including the mobile object 220. The vehicle computer 110 can then analyze the image data, e.g., according to known image processing techniques, to determine a location of the mobile object 220 relative to the vehicle 105.

The vehicle computer 110 can then combine the location of the mobile object 220 relative to the vehicle 105 to a location of the vehicle 105, e.g., using known data processing techniques, to determine a location of the mobile object 220. That is, the vehicle computer 110 can determine a location of the mobile object 220 in local coordinates, i.e., a Cartesian coordinate system having an origin on the vehicle 105, and can then transform the local coordinates into real-world coordinates to determine the location of the mobile object 220, e.g., according to known geometric transformation techniques. The vehicle computer 110 can determine the location of the vehicle 105 based on receiving location data, e.g., GPS coordinates, of the vehicle 105, as discussed above.

Upon determining a mobile object 220 is within the monitoring area 225 of the target region 210, the vehicle computer 110 can determine whether the mobile object 220 is within the target region 210 based on the location of the mobile object 220. The vehicle computer 110 can compare the location of the mobile object 220 to a geo-fence for the target region 210. The vehicle computer 110 can then determine that the mobile object 220 is within the target region 210 based on the location of the mobile object 220 indicating the mobile object 220 is within the geo-fence.

Upon determining that the mobile object 220 is within the target region 210 (see FIG. 2B), the vehicle computer 110 actuates a braking component 125. Specifically, the vehicle computer 110 actuates the braking component 125 to reduce a likelihood of the vehicle 105 entering the target region 210 while the mobile object 220 is within the target region 210. The vehicle computer 110 can determine a deceleration of the vehicle 105 to reduce the likelihood of entering the target region 210 while the mobile object 220 remains within the target region 210. For example, the vehicle computer 110 can predict an exit time for the mobile object 220 to exit the target region assuming a constant speed for the mobile object 220 through the target region 210:

$$t_{p,o}(k) = \frac{s_{p,o} - s_p(k)}{v_p(k)} \tag{1}$$

where, k denotes a discrete time step, $t_{p,o}(k)$ is the predicted exit time for the mobile object 220, $s_{p,o}$ is a position of the mobile object 220 when exiting the target region 210, i.e., a position of the far-side boundary 215d of the target region 210, $s_p(k)$ is the position of the mobile object 220, $v_p(k)$ is the speed of the mobile object 220.

The vehicle computer 110 can determine the position $s_{p,o}$ of the far-side boundary 215d by determining a midpoint between geo-coordinates specifying the ends of the far-side boundary 215d, e.g., according to known calculation techniques.

The vehicle computer 110 can determine the position $s_p(k)$ of the mobile object 220 based on the location of the mobile object 220. Upon determining the location of the mobile object 220, the vehicle computer 110 can determine a midpoint of the near-side boundary 215c of the target region 210 based on geo-coordinates defining respective ends of the near-side boundary 215c, e.g., according to known calculation methods. The vehicle computer 110 can then determine a distance $D_P$ between the location of the mobile object 220 and the midpoint of the near-side boundary 215c, e.g., by comparing respective geo-coordinates. The position $s_p(k)$ of the mobile object 220 is defined by this distance $D_P$.

The vehicle computer 110 can, for example, determine the speed $v_p(k)$ of the mobile object 220 by receiving data from the user device 145 indicating a speed of the mobile object 220, e.g., via the network 135. As another example, the vehicle computer 110 can determine the speed $v_p(k)$ of the mobile object 220 based on determining a change in positions $s_p(k)$ of the mobile object 220 over time. For example, the vehicle computer 110 can determine the speed $v_p(k)$ of the mobile object 220 with the formula $\Delta D/\Delta T$, where $\Delta D$ is a difference between a pair of positions $s_p(k)$ of the mobile object 220 taken at different times and $\Delta T$ is an amount of time between when the pair of positions $s_p(k)$ was determined. For example, the difference $\Delta D$ between the pair of positions $s_p(k)$ may be determined by subtracting the position $s_p(k)$ determined earlier in time from the position $s_p(k+1)$ determined later in time.

Upon determining the predicted exit time $t_{p,o}(k)$ for the mobile object 220, the vehicle computer 110 can then determine a maximum vehicle speed $v'_v$ at $t_{p,o}(k)$, which may prevent a collision between the vehicle 105 and the mobile object 220 and minimizes an amount of time for the vehicle 105 to traverse the target region 210:

$$v'_v(t_{p,o}(k)) = \frac{2|s_v(k)|}{t_{p,o}(k)} - v_v(k) \qquad (2)$$

where, $v_v(k)$ is a current vehicle speed, and $s_v(k)$ is a current position of the vehicle 105. The maximum vehicle speed $v'_v$ can be determined assuming that the vehicle computer 110 controls the vehicle 105 to decelerate uniformly from the current vehicle speed $v_v(k)$ to the maximum vehicle speed $v'_v$.

Upon determining the maximum vehicle speed $v'_v$ and the predicted exit time $t_{p,o}(k)$ for the mobile object 220, the vehicle computer 110 can determine a vehicle acceleration $a_v(k)$ to reduce the likelihood of impacting the mobile object 220 while minimizing an amount of time for the vehicle 105 to traverse the target region 210:

$$a_v(k) = \begin{cases} \frac{-v_v(k)^2}{2|s_v(k)|}, & v'_v < 0 \\ \frac{(v'_v - v_v(k))}{t_{p,o}(k)}, & 0 \leq v'_v \leq v_v(k) \\ 0, & \text{otherwise} \end{cases} \qquad (3)$$

The vehicle computer 110 can actuate the braking component 125 to achieve the acceleration $a_v(k)$ determined according to Equation 3 subject to an acceleration range defined by a maximum acceleration $a_{v,max}$ and a maximum deceleration $a_{v,min}$ for the vehicle 105. The maximum acceleration $a_{v,max}$ is a largest value of acceleration that the vehicle 105 is physically able to achieve, e.g., given design and/or component parameters, and the maximum deceleration $a_{v,min}$ is a largest value of deceleration that the vehicle 105 is physically able to achieve, e.g., given design and/or component parameters. The maximum deceleration $a_{v,min}$ may be an additive of the maximum acceleration $a_{v,max}$, i.e., $a_{v,min} = -a_{v,max}$. Upon detecting that the mobile object 220 has departed the target region 210, the vehicle computer 110 can operate the vehicle 105 based on the requested speed $v_{v,0}$, as discussed below.

Upon determining that the mobile object 220 is outside of the target region 210, e.g., based on the location of mobile object 220 indicating the mobile object 220 is outside the geo-fence, the vehicle computer 110 can determine whether the mobile object 220 is approaching or departing the target region 210. The vehicle computer 110 can determine that the mobile object 220 is approaching, i.e., moving towards, the target region 210 based on the location of the mobile object 220 being closer to the geo-fence than a previous location of the mobile object 220. Conversely, the vehicle computer 110 can determine that the mobile object 220 is departing the target region 210 based on the location of the mobile object 220 being outside the geo-fence when a previous location of the mobile object 220 was inside the geo-fence. Additionally, or alternatively, the vehicle computer 110 can determine that the mobile object 220 is moving away from the target region 210 based on the location of the mobile object 220 being farther from the geo-fence than the previous location of the mobile object 220.

Upon detecting an absence of a mobile object 220 within the monitoring area 225 or the mobile object 220 departing the target region 210, the vehicle computer 110 can operate the vehicle 105 based on the requested speed $v_{v,0}$. For example, the vehicle computer 110 can actuate one or more vehicle components 125 to continue to operate the vehicle 105 at the requested speed $v_{v,0}$. That is, the vehicle computer 110 can maintain vehicle 105 operation at the requested speed $v_{v,0}$, e.g., prior to a mobile object 220 approaching the target region 210. As another example, the vehicle computer 110 can actuate one or more vehicle components 125 to accelerate, i.e., increase, the speed $v_v$ of the vehicle 105 to the requested speed $v_{v,0}$, e.g., after the mobile object 220 has departed the target region 210. In this situation, the vehicle computer 110 can actuate one or more vehicle components 125 to accelerate the vehicle 105 based on a predetermined acceleration. That is, the vehicle computer 110 may operate the vehicle 105 to uniformly accelerate according to the predetermined acceleration. The predetermined acceleration may, for example, be specified by a vehicle and/or component manufacturer, e.g., based on maintaining smooth vehicle operation while minimizing an amount of time to reach the requested speed $v_{v,0}$. As another example, the vehicle and/or component manufacturer may specify the predetermined acceleration to be the maximum acceleration $a_{v,max}$ for the vehicle 105.

If the vehicle computer 110 determines that the mobile object 220 is approaching the target region 210, then the vehicle computer 110 determines an optimized speed profile $T_o$ for the vehicle 105. The optimized speed profile $T_o$ specifies an optimal speed $v_v$ for the vehicle 105 and an optimal acceleration $a_v$ for the vehicle 105 for operating the vehicle 105 while approaching the target region 210. Specifically, the vehicle computer 110 determines a target speed profile $T_{a,v}$ that minimizes an amount of time for the vehicle 105 to traverse the target region 210 while reducing a likelihood of the vehicle 105 impacting a mobile object 220 in the target region 210.

To determine the optimized speed profile $T_o$, the vehicle computer 110 determines a target speed profile $T_{a,v}$ with a stochastic model predictive control (SMPC) algorithm. An SMPC algorithm is an algorithm that is executed in a rolling horizon to minimize a cost function based on respective positions $s_v$, $s_p$ and speeds $v_v$, $v_p$ of the vehicle 105 and the mobile object 220. As used herein, a "rolling horizon" means that a time-dependent optimization problem, including locations of objects in a vehicle coordinate system, is solved repeatedly, and an interval of the optimization problem is moved forward in time during each solution step. The SMPC can be:

$$\min_{a_v} E(t_{v,o}), \text{ subject to} \quad (4)$$

$$\begin{bmatrix} s_v(k+1) \\ v_v(k+1) \end{bmatrix} = \begin{bmatrix} 1 & \Delta T \\ 0 & 1 \end{bmatrix} \begin{bmatrix} s_v(k) \\ v_v(k) \end{bmatrix} + \begin{bmatrix} \frac{1}{2}\Delta T^2 \\ \Delta T \end{bmatrix} a_v(k), k \in [0, 1, \ldots, N-1] \quad (5)$$

$$0 \le v_v(k) \le v_{v,max} \quad (6)$$

$$a_{v,min} \le a_v(k) \le a_{v,max} \quad (7)$$

$$P_c(\text{status}_v(k) = 1 \wedge \text{status}_p(k) = 1) < \beta \quad (8)$$

where $t_{v,o}$ is a predicted vehicle exit time, i.e., a time at which the vehicle 105 is predicted to depart the target region 210, E is a cost function to be minimized, i.e., an expected amount of time for the vehicle 105 to travel through the target region 210, by manipulating the vehicle acceleration sequence $a_v(k)$ on the considered time horizon of length N (i.e., future time period under consideration), $\text{status}_v$ and $\text{status}_p$ are variables equal to one when the corresponding object, i.e., the vehicle 105 or mobile object 220, is in the target region 210 and otherwise equal to zero, $\Delta T$ is time discretization, $v_{v,max}$ is a maximum vehicle speed, $P_c$ is a probability of the vehicle 105 impacting the mobile object 220 in the target region 210, $\beta$ is a predetermined threshold probability (e.g., specified by a vehicle and/or component manufacturer to limit the likelihood of a vehicle 105 entering the target region 210 while a mobile object 220 is in the target region 210), and $\wedge$ is the "logical and" operator.

The vehicle computer 110 can optimize the target speed profile $T_{a,v}$ by using an exhaustive grid search over all combinations of target vehicle speeds $v_{v,t}$ and target vehicle accelerations $a_{v,t}$ to determine the optimal speed $v_v$ and the optimal acceleration $a_v$ that minimize the cost function E and satisfy chance constraint, i.e., probability of collision $P_c$ being lower than a predefined threshold $\beta$:

$$(t_{v,o,min} = \min(E(t_{v,o}))) \wedge (P_c < \beta),$$

$$v_{v,t} \in [0, \ldots, v_{v,max}], a_{v,t} \in [0, \ldots, a_{v,max}] \quad (9)$$

where $t_{v,o,min}$ is a minimum amount of time for the vehicle 105 to depart the target region 210 and is initialized to be an arbitrarily large number.

The vehicle computer 110 can then determine a sign of the optimal acceleration $a_v$ based on a comparison between the current vehicle speed $v_v(k)$ and the selected target speed $v_{v,t}$:

$$a_v = \begin{cases} a_{v,t}, & v_{v,t} > v_v(k) \\ -a_{v,t}, & v_{v,t} < v_v(k) \\ 0, & \text{otherwise} \end{cases} \quad (10)$$

To optimize the target speed profile $T_{a,v}$, the vehicle computer 110 determines the cost function E and the probability of collision $P_c$ for each combination of target vehicle speed $v_{v,t}$ and target vehicle acceleration $a_{v,t}$. For a given combination of a target vehicle speed $v_{v,t}$ and a target vehicle acceleration $a_{v,t}$, the vehicle computer 110 can determine the cost function E and the probability of collision $P_c$ for all possible scenarios of mobile object 220 entry times to and exit times from the target region 210. One scenario is defined as one combination of discrete time steps for the mobile object 220 entry and exit times with a corresponding probability determined by:

$$p_{ij} = p_{p,in,i} \cdot p_{p,out,j} \quad (11)$$

where $p_{p,in,i}$ is the probability that the mobile object 220 will enter the target region 210 at the $i^{th}$ time step on a time horizon $t_{p,in}$, $p_{p,out,j}$ is the probability that the mobile object 220 will exit the target region at the $j^{th}$ time step on a time horizon $t_{p,out}$. The vehicle computer 110 can select $p_{p,in,i}$ from the entry probability distribution $P_1$ of predicted entry times at which the mobile object 220 will enter the target region 210. The vehicle computer 110 can select $p_{p,out,j}$ from the exit probability distribution $P_2$ of predicted exit times at which the mobile object 220 will exit the target region 210.

To determine the entry probability distribution $P_1$, the vehicle computer 110 inputs the target speed profile $T_{a,v}$, i.e., the selected combination of the target vehicle speed $v_{v,t}$ and the target vehicle acceleration $a_{v,t}$, the speed $v_v(k)$ of the vehicle 105, the speed $v_p(k)$ of the mobile object 220, the position $s_v(k)$ of the vehicle 105, and the position $s_p(k)$ of the mobile object 220 into a first neural network 400, such as a deep neural network (DNN). (See FIG. 4). The first DNN 400 can be trained to accept the target speed profile $T_{a,v}$, the speed $v_v(k)$ of the vehicle 105, the speed $v_p(k)$ of the mobile object 220, the position $s_v(k)$ of the vehicle 105, and the position $s_p(k)$ of the mobile object 220 as input and generate the entry probability distribution $P_1$ of predicted entry times at which the mobile object 220 will enter the target region 210. The entry probability distribution $P_1$ includes a plurality of probabilities associated with each timestep in the horizon $t_{p,in} \in [0, \Delta T, \ldots, (i-1)\Delta T, \ldots, (N-1)\Delta T]$ where $i \in [1, \ldots, N]$.

Figure 5:
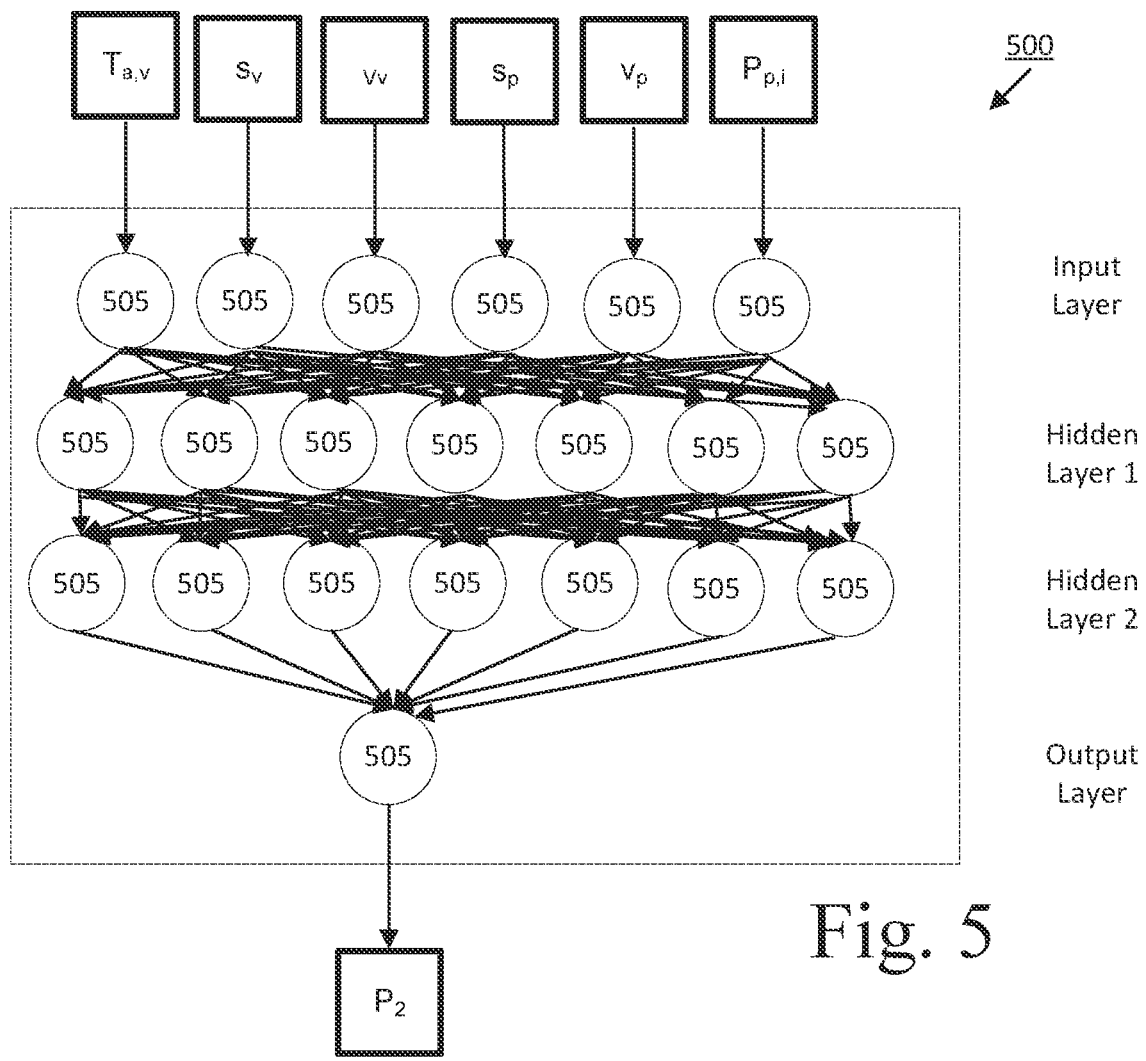
FIG. 5 is an example second neural network.

To determine the exit probability distribution $P_2$, the vehicle computer 110 inputs the target speed profile $T_{a,v}$, i.e., the selected combination of the target vehicle speed $v_{v,t}$ and the target vehicle acceleration $a_{v,t}$, the speed $v_v(k)$ of the vehicle 105, the speed $v_p(k)$ of the mobile object 220, the position $s_v(k)$ of the vehicle 105, the position $s_p(k)$ of the mobile object 220, and a predicted entry time $P_{p,i}$ for the mobile object 220 to enter the target region 210 into a second neural network 500, such as a DNN (see FIG. 5). The second DNN 500 can be trained to accept the target speed profile $T_{a,v}$, i.e., the selected combination of the target vehicle speed $v_{v,t}$ and the target vehicle acceleration $a_{v,t}$, the speed $v_v(k)$ of the vehicle 105, the speed $v_p(k)$ of the mobile object 220, the position $s_v(k)$ of the vehicle 105, the position $s_p(k)$ of the mobile object 220, and the predicted entry time $P_{p,i}$ as input and generate exit probability distribution $P_2$ of predicted exit times at which the mobile object 220 will exit the target region 210. The exit probability distribution $P_2$ includes a plurality of probabilities associated with each timestep in the horizon $t_{p,out} \in [0, \Delta T, \ldots, (j-1)\Delta T, \ldots, (N-1)\Delta T]$ where $j \in [1, \ldots, N]$.

The vehicle computer 110 can determine the speed $v_v(k)$ of the vehicle 105 based on sensor 115 data, such as wheel speed sensor data. The vehicle computer 110 can determine the position $s_v(k)$ of the vehicle 105 based on a location of the vehicle 105. The vehicle computer 110 can receive the location of the vehicle 105, as discussed above. The vehicle computer 110 can determine a midpoint of the front boundary 215a of the target region 210 based on geo-coordinates defining respective ends of the front boundary 215a, e.g., according to known calculation methods. The vehicle computer 110 can then determine a distance $D_V$ from the location of the vehicle 105 to the midpoint of the front boundary 215a, e.g., by comparing the respective geo-coordinates.

The position $s_v(k)$ of the vehicle 105 is defined by the distance $D_V$. The vehicle computer 110 can determine the speed $v_p(k)$ and the position $s_p(k)$ of the mobile object 220, e.g., in the manner discussed above.

Upon determining the entry and exit probability distributions $P_1$, $P_2$ associated with the given combination of the target vehicle speed $v_{v,t}$ and the target vehicle acceleration $a_{v,t}$, the vehicle computer 110 can predict a vehicle entry time $t_{v,i}$, i.e., a time at which the vehicle 105 will enter the target region 210, and the vehicle exit time $t_{v,o}$ based on the given combination of the target vehicle speed $v_{v,t}$ and the target vehicle acceleration $a_{v,t}$, and an assumption that a mobile object 220 does not enter the target region 210 prior to the vehicle exit time $t_{v,o}$:

$$t_{v,i} = \begin{cases} \dfrac{-v_{v,init} + \sqrt{v_{v,init}^2 + 2a_{v,t}|s_{v,init}|}}{a_{v,t}}, \Delta s > |s_{v,init}| \\ \dfrac{v_{v,t}\Delta t - v_{v,init}\Delta t - \frac{1}{2}a_{v,t}\Delta t^2 + |s_{v,init}|}{v_{v,t}}, \Delta s \le |s_{v,init}| \end{cases} \quad (12)$$

$$t_{v,o} = \begin{cases} \dfrac{-v_{v,init} + \sqrt{v_{v,init}^2 + 2a_{v,t}(|s_{v,init}|+l)}}{a_{v,t}}, \Delta s > (|s_{v,init}|+l) \\ \dfrac{v_{v,t}\Delta t - v_{v,init}\Delta t - \frac{1}{2}a_{v,t}\Delta t^2 + |s_{v,init}| + l}{v_{v,t}}, \Delta s \le (|s_{v,init}|+l) \end{cases} \quad (13)$$

where the subscript "init" denotes a value at the current timestep k, l is a sum of a length of the vehicle 105, e.g., stored in a memory of the vehicle computer 110, and a width of the target region 210, e.g., specified in the map data as a distance measured from the front boundary 215a to the rear boundary 215b along the travel direction of the travel path 205, and $\Delta s$ is a traveled distance until achieving $v_{v,t}$ given by:

$$\Delta s = v_{v,init} \cdot \Delta t + \tfrac{1}{2}a_{v,t}\Delta t^2 \quad (14)$$

and $\Delta t$ is an amount of time until achieving $v_{v,t}$ given by:

$$\Delta t = \frac{v_{v,t} - v_{v,init}}{a_{v,t}} \quad (15)$$

Upon predicting the vehicle entry time $t_{v,i}$ for the given combination of the target vehicle speed $v_{v,t}$ and the target vehicle acceleration $a_{v,t}$, the vehicle computer 110 can determine the probability of collision $P_c$ for the given combination of the target vehicle speed $v_{v,t}$ and the target vehicle acceleration $a_{v,t}$:

$$P_c = \sum_{i=1}^{N}\sum_{j=i}^{N} p_{i,j} H^-(d_m - d_{i,j}) \quad (16)$$

where $H^-$ is an inverted Heaviside (i.e., unit step) function, which takes a value 1 if $d_{i,j} > d_m$, otherwise takes a value of 0, $d_m$ is a predetermined deceleration of the vehicle 105. $d_m$ can be specified by a vehicle and/or component manufacturer, e.g., based on reducing a likelihood of impacting a mobile object 220. For example, $d_m$ can be set to the maximum deceleration $a_{v,min}$ for the vehicle 105. $d_{i,j}$ is a deceleration of the vehicle 105 to reduce a likelihood of impacting a mobile object 220 in the target region 210 for the one scenario:

$$d_{i,j} = \begin{cases} 0, t_{v,i} \le t_{p,in,i} \| (t_{p,in,i} < t_{v,i} \wedge a_v \ge 0) \\ |a_v|, (t_{p,in,i} < t_{v,i} \wedge a_v < 0) \end{cases} \quad (17)$$

where $\|$ is the "logical or" operator, and $t_{p,in,i}$ is the mobile object 220 entry time at the $i^{th}$ time step for the time horizon $t_{p,in}$.

In addition to determining the probability of collision $P_c$, the vehicle computer 110 can determine the cost function E for the given combination of the target vehicle speed $v_{v,t}$ and the target vehicle acceleration $a_{v,t}$:

$$E(t_{v,o}) = \sum_{i=1}^{N}\sum_{j=i}^{N} p_{i,j} t_{v,o,i,j} \quad (18)$$

where $t_{v,o,i,j}$ is a vehicle exit time at which the vehicle 105 will depart the target region 210 for the one scenario. The vehicle computer 110 can determine $t_{v,o,i,j}$ based on comparing $t_{v,i}$ and $t_{p,in,i}$. If $t_{v,i} \le t_{p,in,i}$, then the vehicle computer 110 can determine that $t_{v,o,i,j} = t_{v,o}$ (see FIG. 3A). If $t_{p,in,i} < t_{v,i}$, then the vehicle computer 110 can determine $t_{v,o,i,j}$ based on $t_{p,in,i}$ and $t_{p,out,j}$ by applying a piecewise affine function (see FIG. 3B). In this situation, the vehicle computer 110 determines a position $s_v(t_{p,in,i})$ and a speed $v_v(t_{p,in,i})$ of the vehicle at $t_{p,in,i}$, i.e., when the mobile object 220 enters the target region 210 for the one scenario:

$$s_v(t_{p,in,i}) = \begin{cases} s_{v,init} + v_{v,init} \cdot t_{p,in,i} + \frac{1}{2}a_{v,t} \cdot t_{p,in,i}^2, \Delta t > t_{p,in,i} \\ s_{v,init} + v_{v,init} \cdot \Delta t + \frac{1}{2}a_{v,t} \cdot \Delta t^2 + v_{v,t} \cdot (t_{p,in,i} - \Delta t), \Delta t \le t_{p,i} \end{cases} \quad (19)$$

$$v_v(t_{p,in,i}) = \begin{cases} v_{v,init} + a_{v,t} \cdot t_{p,in,i}, \Delta t > t_{p,in,i} \\ v_{v,t}, \Delta t \le t_{p,in,i} \end{cases} \quad (20)$$

Based on the position $s_v(t_{p,in,i})$ and the speed $v_v(t_{p,in,i})$ of the vehicle at $t_{p,in,i}$, the vehicle computer 110 can determine a maximum speed $v'_v(t_{p,out,j})$ for the vehicle 105 at $t_{p,out,j}$, i.e., when the mobile object 220 departs the target region 210 for the one scenario, using Equation 2:

$$v'_v(t_{p,out,j}) = \frac{2|s_v(t_{p,in,i})|}{t_{p,out,j} - t_{p,in,i}} - v_v(t_{p,in,i}) \quad (21)$$

Additionally, the vehicle computer 110 can determine the deceleration $d_{i,j}$ of the vehicle 105 to reduce the likelihood of impacting the mobile object 220 in the target region 210 for the one scenario using Equations 3 and 17:

$$d_{i,j} = \begin{cases} \dfrac{(v_v(t_{p,in,i}))^2}{2 \cdot |s_v(t_{p,in,i})|}, v'_v(t_{p,out,j}) < 0 \\ \dfrac{-(v'_v(t_{p,out,j}) - v_v(t_{p,in,i}))}{t_{p,out,j} - t_{p,in,i}}, 0 \le v'_v(t_{p,out,j}) \le (t_{p,in,i}) \\ 0, v'_v(t_{p,out,j}) \ge v_v(t_{p,in,i}) \end{cases} \quad (22)$$

The vehicle computer 110 can then determine a position $s_v(t_{p,out,j})$ and a speed $v_v(t_{p,out,j})$ of the vehicle 105 at $t_{p,out,j}$, i.e., when the mobile object 220 departs the target region 210 for the one scenario:

$$s_v(t_{p,out,j}) = s_v(t_{p,in,i}) + v_v(t_{p,in,i}) \cdot (t_{p,out,j} - t_{p,in,i}) - \frac{1}{2} d_b(t_{p,out,j} - t_{p,in,i})^2 \quad (23)$$

$$v_v(t_{p,out,j}) = \begin{cases} 0, & v'_v(t_{p,out,j}) \leq 0 \\ v'_v(t_{p,out,j}), & 0 \leq v'_v(t_{p,out,j}) < v_v(t_{p,in,i}) \end{cases} \quad (24)$$

The vehicle computer 110 can then determine $t_{v,o,i,j}$:

$$t_{v,o,i,j} = t'_{v,o} + t_{p,out,j} \quad (25)$$

where:

$$t'_{v,o} = \begin{cases} \dfrac{|s_v(t_{p,out,j})| + l}{v_v(t_{p,out,j})}, & v_v(t_{p,out,j}) \geq v_{v,0} \\[6pt] \dfrac{-v_v(t_{p,out,j}) + \sqrt{v_v(t_{p,out,j})^2 + 2a_{v,init}(|s_v(t_{p,out,j})| + l)}}{a_{v,init}}, \\ \qquad \Delta s' > |s_v(t_{p,out,j})| + l \\[6pt] \dfrac{v_{v,0}\Delta t' - v_v(t_{p,out,j})\Delta t' - \frac{1}{2}a_{v,init}\Delta t'^2 + |s_v(t_{p,out,j})| + l}{v_{v,0}}, \\ \qquad \Delta s' \leq |s_v(t_{p,out,j})| + l \end{cases} \quad (26)$$

and:

$$\Delta s' = v_v(t_{p,out,j}) \cdot \Delta t' + \frac{1}{2} a_{v,init} \Delta t'^2 \quad (27)$$

$$\Delta t' = \frac{v_{v,0} - v_v(t_{p,out,j})}{a_{v,init}} \quad (28)$$

Upon determining the optimized speed profile $T_o$, the vehicle computer 110 can operate the vehicle 105 based on the optimized speed profile $T_o$. For example, the vehicle computer 110 can actuate one or more vehicle components 125 to move the vehicle 105 while satisfying the optimal speed $v_v$ and the optimal acceleration $a_v$. Specifically, the vehicle computer 110 can operate the vehicle 105 to uniformly accelerate from a current speed $v_v(k)$ to the optimal speed $v_v$ according to the optimal acceleration $a_v$.

Upon departing the target region 210, the vehicle computer 110 can be programmed to operate the vehicle 105 based on the requested speed $v_{v,0}$. For example, the vehicle computer 110 can actuate one or more vehicle components 125 to continue to operate the vehicle 105 at the requested speed $v_{v,0}$. That is, the vehicle computer 110 can maintain vehicle 105 operation at the requested speed $v_{v,0}$, e.g., when the vehicle 105 departs the target region 210 at the request speed $v_{v,0}$. As another example, the vehicle computer 110 can actuate one or more vehicle components 125 to update, e.g., increase or decrease, the speed of the vehicle 105 to the requested speed $v_{v,0}$, e.g., when the vehicle 105 departs the target region 210 at a speed different from the requested speed $v_{v,0}$. In this situation, the vehicle computer 110 can actuate one or more vehicle components 125 to update the speed of the vehicle 105 based on a predetermined acceleration, as discussed above.

Figure 4:
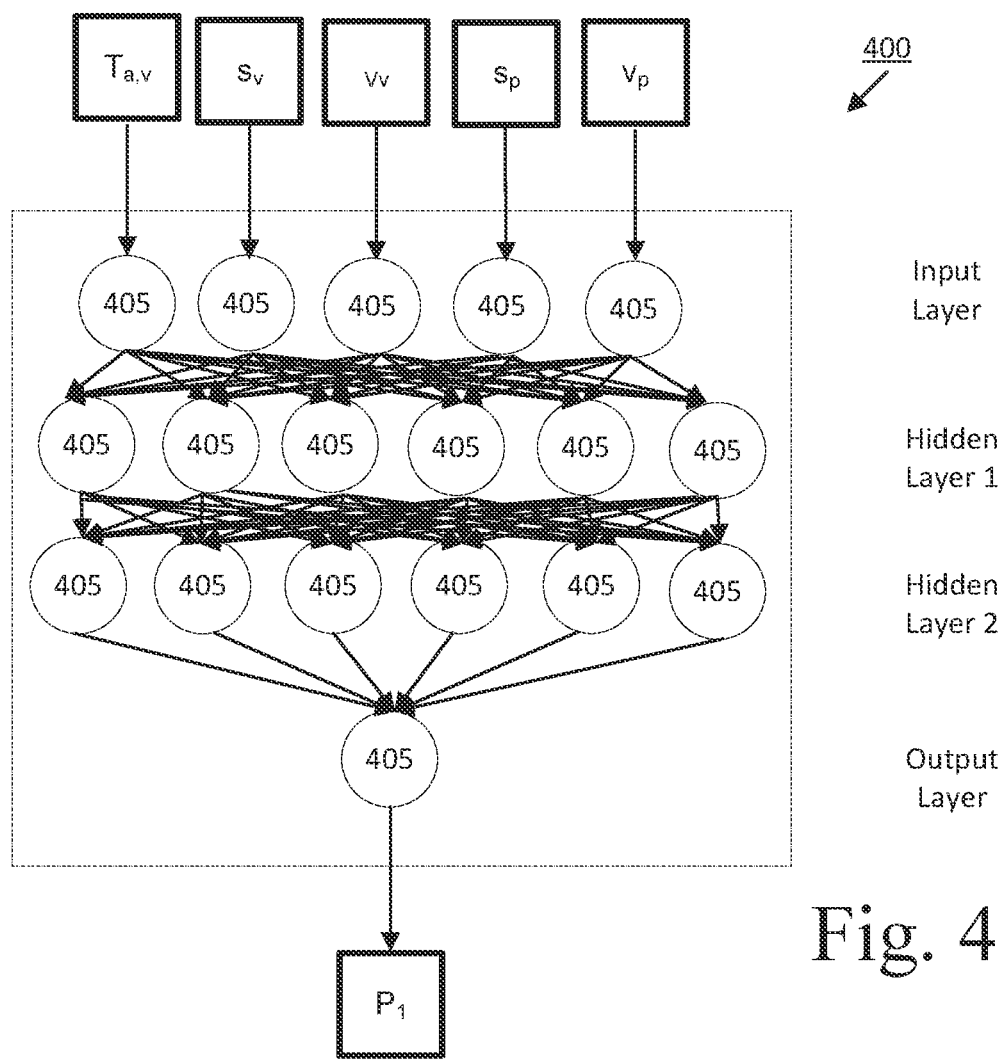
FIG. 4 is an example first neural network.

FIG. 4 is a diagram of an example first deep neural network (DNN) 400 that can be trained to determine the entry probability distribution based on the target speed profile $T_{a,v}$, i.e., the selected combination of the target vehicle speed $v_{v,t}$ and the target vehicle acceleration $a_{v,t}$, the speed $v_v(k)$ of the vehicle 105, the speed $v_p(k)$ of the mobile object 220, the position $s_v(k)$ of the vehicle 105, and the position $s_p(k)$ of the mobile object 220.

FIG. 5 is a diagram of an example second deep neural network (DNN) 400 that can be trained to determine the exit probability distribution based on the target speed profile $T_{a,v}$, i.e., the selected combination of the target vehicle speed $v_{v,t}$ and the target vehicle acceleration $a_{v,t}$, the speed $v_v(k)$ of the vehicle 105, the speed $v_p(k)$ of the mobile object 220, the position $s_v(k)$ of the vehicle 105, the position $s_p(k)$ of the mobile object 220, and the predicted entry time for the mobile object 220 to enter the target region 210.

The DNNs 400, 500 can be a software program that can be loaded in memory and executed by a processor included in a computer, for example. In an example implementation, the DNNs 400, 500 can include, but is not limited to, a convolutional neural network (CNN), R-CNN (Region-based CNN), Fast R-CNN, and Faster R-CNN. The DNN 400, 500 includes multiple nodes, and the nodes are arranged so that the DNNs 400, 500 includes an input layer, one or more hidden layers, and an output layer. Each layer of the DNNs 400, 500 can include a plurality of nodes 405, 505. While FIGS. 4-5 illustrate two hidden layers, it is understood that the DNNs 400, 500 can include additional or fewer hidden layers. The input layers for the DNNs 400, 500 includes a plurality of input nodes 405, 505. The output layers may also include more than one node 405, 505.

The nodes 405, 505 are sometimes referred to as artificial neurons 405, 505 because they are designed to emulate biological, e.g., human, neurons. A set of inputs (represented by the arrows) to each neuron 405, 505 are each multiplied by respective weights. The weighted inputs can then be summed in an input function to provide, possibly adjusted by a bias, a net input. The net input can then be provided to an activation function, which in turn provides a connected neuron 405, 505 an output. The activation function can be a variety of suitable functions, typically selected based on empirical analysis. As illustrated by the arrows in FIGS. 4-5, neuron 405, 505 outputs can then be provided for inclusion in a set of inputs to one or more neurons 405, 505 in a next layer.

As one example, the DNNs 400, 500 can be trained with ground truth data, i.e., data about a real-world condition or state. For example, the DNNs 400, 500 can be trained with ground truth data and/or updated with additional data by a processor of the remote server computer 140. Weights can be initialized by using a Gaussian distribution, for example, and a bias for each node 405, 505 can be set to zero. Training the DNNs 400, 500 can include updating weights and biases via suitable techniques such as back-propagation with optimizations. Ground truth data used for training can include, but is not limited to, data manually labeled by human operators as specifying probabilities of a mobile object 220 entering and exiting a target region 210 for various speeds $v_p$ and positions $s_p$ of a mobile object 220.

During operation, the vehicle computer 110 determines the target speed profile $T_{a,v}$, i.e., the selected combination of the target vehicle speed $v_{v,t}$ and the target vehicle acceleration $a_{v,t}$, the speed $v_v(k)$ of the vehicle 105, the speed $v_p(k)$ of the mobile object 220, the position $s_v(k)$ of the vehicle 105, the position $s_p(k)$ of the mobile object 220. Additionally, the vehicle computer 110 determines a predicted entry time $P_{p,i}$ for the mobile object 220 to enter the target region 210. The vehicle computer 110 can provide the target speed profile $T_{a,v}$, the speed $v_v(k)$ of the vehicle 105, the speed $v_p(k)$ of the mobile object 220, the position $s_v(k)$ of the vehicle 105, the position $s_p(k)$ of the mobile object 220 to the first DNN 400. The first DNN 400 generates an output based on the received input. The output is an entry probability distribution $P_1$ of predicted entry times at which a mobile object 220 will enter a target region 210.

Additionally, the vehicle computer 110 can provide the target speed profile $T_{a,v}$, the speed $v_v(k)$ of the vehicle 105, the speed $v_p(k)$ of the mobile object 220, the position $s_v(k)$ of the vehicle 105, the position $s_p(k)$ of the mobile object 220, and the predicted entry time $P_{p,i}$ for the mobile object 220 to enter the target region 210 to the second DNN 500. The second DNN 500 generates an output based on the received input. The output is an exit probability distribution $P_2$ of predicted exit times at which the mobile object 220 will exit the target region 210.

Figure 6:
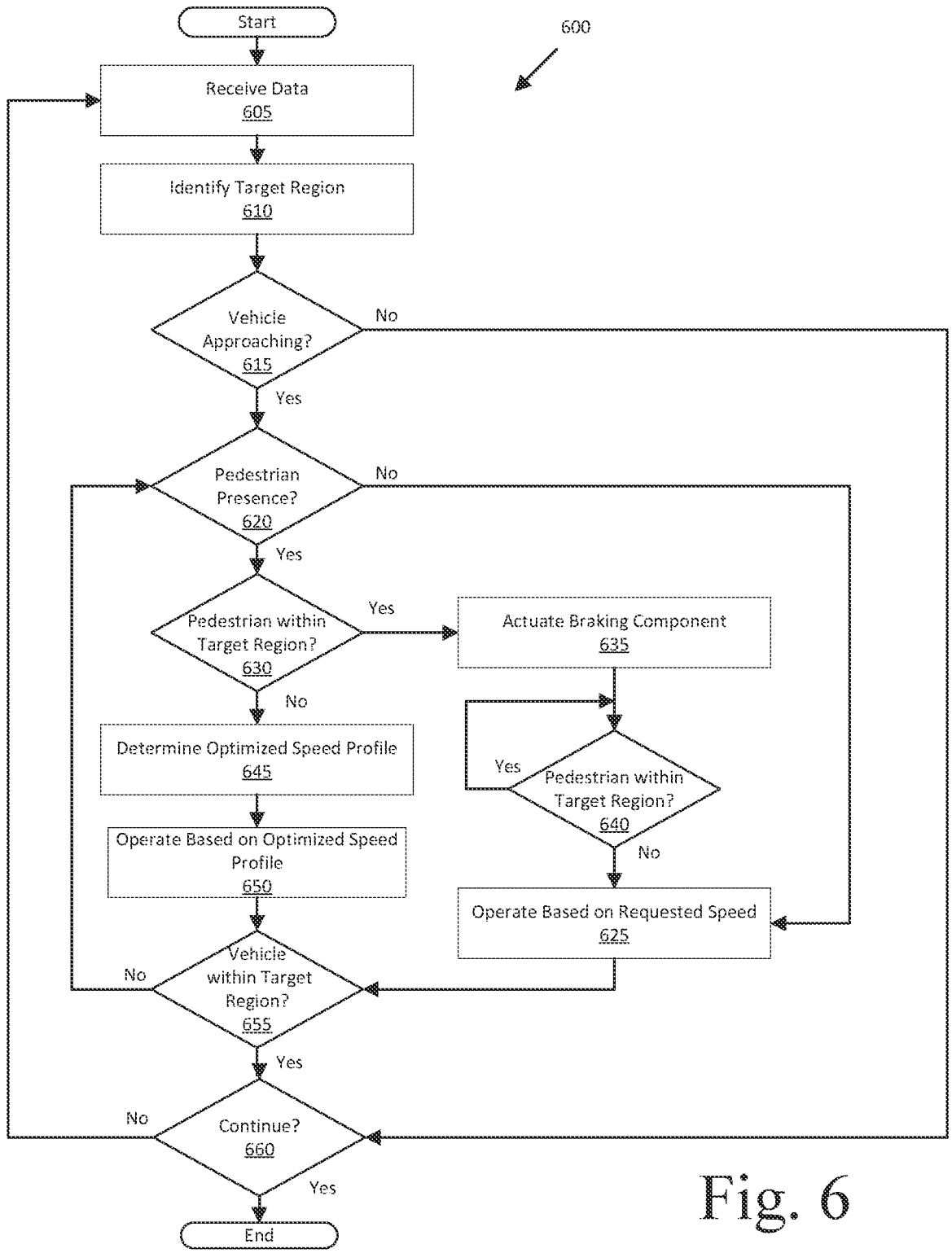
FIG. 6 is an example flowchart of an example process for operating the vehicle while approaching the target region.

FIG. 6 is a flowchart of an example process 600 executed in a vehicle computer 110 according to program instructions stored in a memory thereof for operating a vehicle 105 while approaching a target region 210. Process 600 includes multiple blocks that can be executed in the illustrated order. Process 600 could alternatively or additionally include fewer blocks or can include the blocks executed in different orders.

The process 600 begins in a block 605. In the block 605, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive image data, e.g., from one or more image sensors 115. The image data may include data about the environment around the vehicle 105, e.g., objects 220 around the vehicle 105, etc. Additionally, the vehicle computer 110 can receive sensor 115 data from the HMI 118 including data about a user input specifying a requested speed $v_{v,0}$. The process 600 continues in a block 610.

In the block 610, the vehicle computer 110 identifies a target region 210 within an operating area 200. The vehicle computer 110 can identify the target region 210 based on the sensor 115 data obtained in the block 605 and/or map data, as discussed above. The process 600 continues in a block 615.

In the block 615, the vehicle computer 110 determines whether the vehicle 105 is approaching, i.e., moving towards, the target region 210. The vehicle computer 110 can determine that the vehicle 105 is approaching the target region 210 based on a location of the vehicle 105 and a geo-fence of the target region 210, as discussed above. If the vehicle 105 is approaching the target region 210, then the process 600 continues in a block 620. If the vehicle 105 is within the target region 210 or moving away from, e.g., departing, the target region 210, then the process 600 continues in a block 660.

In the block 620, the vehicle computer 110 determines whether a mobile object 220 is present within a monitoring area 225 around the target region 210. The vehicle computer 110 can determine a presence or absence of a mobile object 220 within the monitoring area 225 based on a location of the mobile object 220, as discussed above. If the vehicle computer 110 determines a mobile object 220 is within the monitoring area 225, then the process 600 continues in a block 630. Otherwise, the process 600 continues in a block 625.

In the block 625, the vehicle computer 110 operates the vehicle 105 based on the requested speed $v_{v,0}$, as discussed above. The process 600 continues in the block 660.

In the block 630, the vehicle computer 110 determines whether the mobile object 220 is within the target region 210. The vehicle computer 110 can determine a presence or an absence of the mobile object 220 within the target region 210 based on the location of the mobile object 220, as discussed above. If the vehicle computer 110 determines the mobile object 220 is within the target region 210, then the process 600 continues in a block 635. Otherwise, the process 600 continues in a block 645.

In the block 635, the vehicle computer 110 actuates a braking component 125 to achieve the acceleration $a_v(k)$ determined according to Equation 3 subject to a maximum deceleration $a_{v,min}$ for the vehicle 105, as discussed above. The process 600 continues in a block 640.

In the block 640, the vehicle computer 110 determines whether the mobile object 220 is within the target region 210. The block 640 is substantially the same the block 630 of process 600 and therefore will not be described further to avoid redundancy. If the vehicle computer 110 determines the mobile object 220 is within the target region 210, then the process 600 remains in the block 640. Otherwise, the process 600 continues in the block 625.

In the block 645, the vehicle computer 110 determines an optimized speed profile $T_o$ for the vehicle 105, as discussed above. The process 600 continues in a block 650.

In the block 650, the vehicle computer 110 can operate the vehicle 105 based on the optimized speed profile $T_o$, as discussed above. The process 600 continues in a block 655.

In the block 655, the vehicle computer 110 determines whether the vehicle 105 is within the target region 210 based on a location of the vehicle 105 and a geo-fence of the target region 210, as discussed above. If the vehicle 105 is within the target region 210, then the process 600 continues in the block 660. Otherwise, the process 600 returns to the block 620.

In the block 660, the vehicle computer 110 determines whether to continue the process 600. For example, the vehicle computer 110 can determine to continue when the vehicle 105 is powered on. In another example, the vehicle computer 110 can determine not to continue when the vehicle 105 is powered off. If the vehicle computer 110 determines to continue, the process 600 returns to the block 605. Otherwise, the process 600 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   upon detecting a mobile object approaching a target region, input a target speed profile for a vehicle, a position and a speed for the vehicle and a position and a speed for the mobile object to a first neural network that outputs an entry probability distribution of predicted entry times at which the mobile object will enter the target region;
   input the target speed profile, the position and the speed for the vehicle, the position and the speed for the mobile object, and a predicted entry time at which the mobile object entered the target region to a second neural network that outputs an exit probability distribution of predicted exit times at which the mobile object will exit the target region;
   determine an optimized speed profile based on the entry and exit probability distributions by executing a model predictive control algorithm in a rolling horizon; and
   operate a vehicle based on the optimized speed profile.

2. The system of claim 1, wherein the target speed profile is defined by a target speed and a target acceleration.

3. The system of claim 1, wherein the instructions further include instructions to, upon detecting an absence of the mobile object approaching the target region, operate the vehicle based on a requested speed.

4. The system of claim 3, wherein the instructions further include instructions to determine the requested speed based on a user input.

5. The system of claim 3, wherein the instructions further include instructions to determine the requested speed based on map data.

6. The system of claim 3, wherein the instructions further include instructions to, upon detecting the mobile object departing the target region, operate the vehicle based on the requested speed.

7. The system of claim 1, wherein the instructions further include instructions to, upon detecting the mobile object departing the target region, operate the vehicle based on a requested speed.

8. The system of claim 1, wherein the instructions further include instructions to optimize the target speed profile based on a probability that the vehicle will impact the mobile object in the target region.

9. The system of claim 8, wherein the instructions further include instructions to optimize the target speed profile based additionally on minimizing a cost function for an amount of time for the vehicle to traverse the target region.

10. The system of claim 1, wherein the instructions further include instructions to, upon detecting the mobile object within the target region, actuate a brake component of the vehicle.

11. The system of claim 10, wherein the instructions further include instructions to, upon determining that the mobile object has departed the target region, operate the vehicle based on a requested speed.

12. The system of claim 1, wherein the target region extends entirely across a travel path and partially along the travel path.

13. The system of claim 12, wherein the instructions further include instructions to identify the target region based on detecting markings traversing the travel path.

14. The system of claim 12, wherein the instructions further include instructions to identify the target region based on map data.

15. A method, comprising:
upon detecting a mobile object approaching a target region, inputting a speed profile for a vehicle, a position and a speed for the vehicle and a position and a speed for the mobile object to a first neural network that outputs an entry probability distribution of predicted entry times at which the mobile object will enter the target region;
inputting the speed profile, the position and the speed for the vehicle, the position and the speed for the mobile object, and a predicted entry time at which the mobile object entered the target region to a second neural network that outputs an exit probability distribution of predicted exit times at which the mobile object will exit the target region;
determining an optimized speed profile based on the entry and exit probability distributions by executing a model predictive control algorithm in a rolling horizon; and
operating a vehicle based on the optimized speed profile.

16. The method of claim 15, wherein the target speed profile is defined by a target speed and a target acceleration.

17. The method of claim 15, further comprising, upon detecting one of an absence of the mobile object approaching the target region or the mobile object departing the target region, operating the vehicle based on a requested speed.

18. The method of claim 15, further comprising, upon detecting the mobile object within the target region, actuating a brake component of the vehicle.

19. The method of claim 15, further comprising optimizing the target speed profile based on a probability that the vehicle will impact the mobile object in the target region.

20. The method of claim 19, further comprising optimizing the target speed profile based additionally on minimizing a cost function for an amount of time for the vehicle to traverse the target region.

* * * * *